(12) United States Patent
Beier et al.

(10) Patent No.: US 8,955,403 B2
(45) Date of Patent: Feb. 17, 2015

(54) ACCESSORY GEARBOX DEVICE FOR A JET ENGINE

(75) Inventors: Juergen Beier, Schulzendorf (DE); Gideon Venter, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 215 days.

(21) Appl. No.: 13/593,042

(22) Filed: Aug. 23, 2012

(65) Prior Publication Data

US 2013/0098179 A1    Apr. 25, 2013

(30) Foreign Application Priority Data

Sep. 2, 2011  (DE) .......................... 10 2011 112 255

(51) Int. Cl.
*F16H 37/00*  (2006.01)
*F02C 7/32*  (2006.01)
*F16H 35/00*  (2006.01)

(52) U.S. Cl.
CPC  *F16H 35/00* (2013.01); *F02C 7/32* (2013.01); *F05D 2260/40* (2013.01); *F05D 2220/50* (2013.01); *F05D 2220/76* (2013.01); *Y02T 50/671* (2013.01)
USPC ........................................ 74/15.63; 74/405

(58) Field of Classification Search
USPC ................... 74/15.63, 405, 413, 416
See application file for complete search history.

(56) References Cited

U.S. PATENT DOCUMENTS

| | | | | |
|---|---|---|---|---|
| 5,867,979 | A * | 2/1999 | Newton et al. | 60/226.1 |
| 6,058,791 | A * | 5/2000 | Brunet | 74/15.63 |
| 6,467,725 | B1 * | 10/2002 | Coles et al. | 244/58 |
| 8,519,555 | B2 * | 8/2013 | Dooley et al. | 290/1 A |
| 2003/0176223 | A1 | 9/2003 | Aoki | |
| 2006/0137355 | A1 | 6/2006 | Welch et al. | |
| 2008/0072568 | A1 | 3/2008 | Moniz et al. | |
| 2008/0110151 | A1 | 5/2008 | Welch et al. | |
| 2010/0156113 | A1 | 6/2010 | Lemmers | |

FOREIGN PATENT DOCUMENTS

FR    2946091    12/2010

OTHER PUBLICATIONS

German Search Report dated Jun. 14, 2012 from counterpart application.

* cited by examiner

*Primary Examiner* — Drew Brown
(74) *Attorney, Agent, or Firm* — Timothy J. Klima; Shuttleworth & Ingersoll, PLC

(57) ABSTRACT

The present invention proposes an accessory gearbox for an engine with a drive shaft operatively connectable to a main shaft of the engine, with an extension shaft being provided which can be put into a detachable operative connection to the drive shaft substantially coaxially to said drive shaft of the accessory gearbox At least one auxiliary unit can be detachably arranged on the extension shaft.

14 Claims, 2 Drawing Sheets

ACCESSORY GEARBOX DEVICE FOR A JET ENGINE

Figure 1:
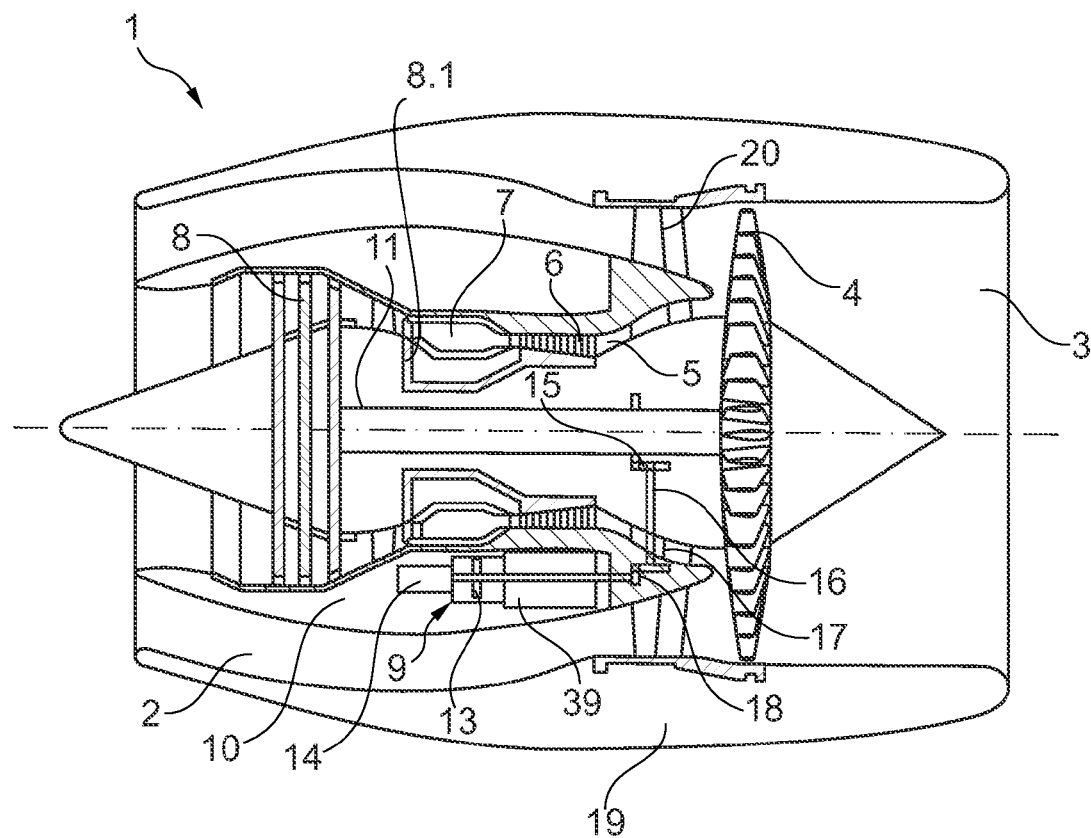

This application claims priority to German Patent Application DE102011112255.2 filed Sep 2, 2011, the entirety of which is incorporated by reference herein.

This invention relates to an accessory gearbox for an engine in accordance with the type defined in greater detail in the generic part of patent Claim 1.

Accessory gearboxes designed for use in engines are usually provided, using which the various auxiliary units, for example a fuel pump, a generator and the like, can be driven proceeding from an engine shaft at a respectively required speed and torque level. To do so, the auxiliary units can each be coupled to an accessory gearbox shaft. The accessory gearbox shafts are arranged substantially parallel to the axis of one another and are adapted to the available installation space inside the engine, they are positioned substantially adjacent to one another and spread in the circumferential direction of the engine, and they are driven via spur gear stages by an accessory gearbox drive shaft operatively connected to the engine shaft.

The generator classed with the auxiliary units and provided as an independent power source for supplying power to an aircraft is driven via an accessory gearbox shaft running parallel to the drive shaft preferably at a speed in the range of approximately 7,000 to 20,000 rpm. Furthermore, known accessory gearboxes can be coupled not only to the generator described, but also to generators of smaller design, so-called permanent magnet alternators (PMAs) which are provided for supplying power to an engine control system.

The generators are each connected to the extent already described to an accessory gearbox shaft of the accessory gearbox provided specifically for the respective generator and fitted to a casing of the accessory gearbox for example by means of a bolt connection, so that the generator can be removed easily and quickly from the accessory gearbox shaft and the casing for repair/maintenance work or can be connected to these.

The already described arrangement of the generator on the accessory gearbox as well as the drive of the generator proceeding from the engine shaft via the drive shaft and the respectively assigned accessory gearbox shaft leads to the accessory gearbox requiring an undesirably large installation space and being characterized by a high overall weight.

The object underlying the present invention is to provide an accessory gearbox for an engine that has a small installation space and a low weight and can be detachably connected in simple manner to an auxiliary unit.

It is a particular object of the present invention to provide solution to the above problems by an accessory gearbox in accordance with the features described herein.

In an accessory gearbox designed in accordance with the invention for an engine with a drive shaft operatively connectable to a main shaft of the engine, an extension shaft is provided in accordance with the invention which can be put into a detachable operative connection to the drive shaft substantially coaxially to said drive shaft, where at least one auxiliary unit can be detachably arranged on the extension shaft.

The accessory gearbox in accordance with the invention has the advantage that for arrangement of the at least one auxiliary unit, in particular designed as a generator, on the accessory gearbox, no separate accessory gearbox shaft has to be provided, that can be driven by the drive shaft and on which in known accessory gearboxes the at least one auxiliary unit is arranged. By the omission of an accessory gearbox shaft, the accessory gearbox can be designed shortened in the circumferential direction of the engine, and the number of gears for operation of the accessory gearbox can be reduced. As a result, installation space and weight are saved and the solution in accordance with the invention can be implemented inexpensively. Due to the reduction in length and in the number of components of the accessory gearbox in the circumferential direction of the engine, the complexity of oil and air lines for supplying the auxiliary units of the shortened accessory gearbox as compared with known accessory gearboxes is also reduced.

The at least one auxiliary unit is, in the solution in accordance with the invention, furthermore detachable from the accessory gearbox in simple manner, for example to be replaced or repaired in the event of damage or for maintenance purposes. The at least one auxiliary unit can be removed from the accessory gearbox in simple manner by detaching the extension shaft from the drive shaft and by detaching the auxiliary unit from the extension shaft in a direction vertical to said extension shaft.

In addition to being designed as a generator, the at least one auxiliary unit can for example be designed as a fuel pump, hydraulic pump, bleed unit, pneumatic starter or the like.

In a simply designed embodiment of the accessory gearbox in accordance with the invention, the at least one auxiliary unit can be detached from the accessory gearbox and fixed on it again in that the extension shaft can be detached from the drive shaft by a translational movement relative to the drive shaft and the at least one auxiliary unit can be detached from the extension shaft by a translational movement relative to the extension shaft.

The at least one auxiliary unit can be detached from the accessory gearbox or arranged on the accessory gearbox particularly simply and quickly when the at least one auxiliary unit is mounted on the accessory gearbox such that an operative connection between the at least one auxiliary unit and the extension shaft can be terminated by a movement of the extension shaft relative to the drive shaft in one direction. If the at least one auxiliary unit is moved sufficiently far relative to the drive shaft and the auxiliary unit is here moved out of engagement with the extension shaft, the auxiliary unit can be detached in simple manner from the extension shaft and removed vertically to the extension shaft.

To ensure a detachability of both the extension shaft from the drive shaft and the auxiliary unit from the extension shaft in a simply designed manner, the extension shaft can have a first area, a second area and in particular a third area, where the first area is designed for interaction with the drive shaft, the second area for interaction with the at least one auxiliary unit and the third area for interaction with at least one further accessory gearbox shaft in particular via a gear of a gear stage.

In a simple embodiment of the invention, the extension shaft can be designed in stages with differing diameter areas. In particular, all stages have here differing radial extents from one another.

The diameter of a first diameter area of the extension shaft is, in an advantageous embodiment of the invention, smaller than the diameter of a second diameter area of the extension shaft, and the diameter of the second diameter area of the extension shaft has in particular a smaller diameter than a third diameter area. As a result, the at least one auxiliary unit can be detached from the extension shaft in the direction of the first diameter area of the extension shaft. Further additional auxiliary units can interact with the extension shaft via the third diameter area of the extension shaft.

To permit an arrangement of the extension shaft on the drive shaft and of the at least one auxiliary unit and in particular of the gear of the gear stage on the extension shaft in a simple design, the diameter areas of the extension shaft interact in particular via a splined gearing with the drive shaft, with the at least one auxiliary unit and in particular with a gear of the gear stage. The splined gearing permits a translational movement in the axial direction and prevents a rotational movement of the respective components relative to one another. In principle, further connection types can be used which allow a translational movement of the respective components relative to one another and in particular prevent a rotational relative movement.

The shafts and a gearbox of the accessory gearbox can, in an advantageous embodiment of the invention, be dimensioned very small if the at least one auxiliary unit is preferably designed as a generator and is connected upstream of further auxiliary units in the force flow of the accessory gearbox. Since the generator can be the main consumer of the accessory gearbox and accordingly requires a high mechanical output, it is not necessary in the advantageous arrangement of the generator for the main load required for the generator to be passed through the accessory gearbox shafts, so that the accessory gearbox shafts and the gearbox of the accessory gearbox can be dimensioned very small. As a result, weight and installation space can be advantageously saved.

In an advantageous embodiment of the invention, it is provided that a casing of the auxiliary unit is designed for linking to an adjoining casing in the installed state of the auxiliary unit in the axial direction of the extension shaft, in particular to a casing of the accessory gearbox and/or to an intermediate casing, where the casing has an appropriate stiffness for withstanding stresses acting on the casing during operation of the accessory gearbox, in particular in the axial and radial directions.

In order to link the casing of the auxiliary unit in a simple manner by frictional connection to the adjoining casing in the axial direction of the extension shaft, the casing of the auxiliary unit can be operatively connected by at least one fastening device, in particular a V-band clip or a bolt connection, to the adjoining casing. As a result, the casing of the auxiliary unit can, in the case of an arrangement between a casing of the accessory gearbox and an intermediate casing, pass on in simple manner a force acting on the accessory gearbox from the casing of the accessory gearbox in the direction of the intermediate casing. In order to withstand the forces acting on the casing during operation of the engine, the casing of the auxiliary unit has a sufficiently large bending resistance. Safeguarding against rotation of the casing of the auxiliary unit relative to the respective adjoining casing can be achieved for example by a pin, a bolt or the like which can be arranged in the axial direction inside flanges of the respective casings in the area of the V-band clip.

For fixing the extension shaft in the axial direction relative to the drive shaft, a securing device can be provided by means of which the extension shaft, in particular in an operating state of the accessory gearbox, can be fixed against a movement relative to the drive shaft in the axial direction.

In an advantageous embodiment of the invention, the extension shaft has in particular in the diameter areas at least one recess via which a connection area of the extension shaft to the drive shaft and/or to the at least one auxiliary unit and/or to the gear of the gear stage can be supplied with a lubricant and/or coolant. The lubricant and/or coolant can be provided inside the extension shaft designed as a hollow shaft and supplied to the respective connection area in the operating state of the accessory gearbox by a centrifugal force through the at least one recess.

It is particularly advantageous when the extension shaft can be arranged overall in an area of an intermediate casing of the engine, i.e. in the radial direction between a bypass duct and an engine core. Alternatively to this, the extension shaft can be arranged outside a bypass duct, for example in an area of a casing.

The at least one auxiliary unit can be designed for supplying power to an engine control system as a generator and in particular as a PMA. Alternatively to this, the generator can also be designed for supplying power to an entire engine, where the generator has in particular a separate cooling system for the removal of thermal energy.

In order to dispense for example with a tank and a pump of the cooling system of the at least one auxiliary unit, a cooling system of the at least one auxiliary unit can be coupled to a cooling device of the accessory gearbox or the engine, respectively.

In a particularly advantageous embodiment of the accessory gearbox in accordance with the invention, a stator area, having at least one stator, of the auxiliary unit which is preferably designed as a generator is separated from a generator rotor area having at least one rotor. This allows in a simply designed manner improved and particularly effective cooling of the generator to be assured, since the cooling medium can come close to the stator in the area of which a major part of the heat is generated in an operating state of the generator.

A complete sealing of the stator area from the rotor area can be achieved with simple means. The separation of the rotor area from the stator area, or the encapsulation of the stator area, also ensures that the cooling medium does not come into contact with electric components of the stator area. Since the rotor is washed by the cooling medium in the operating state of the generator, it can additionally be corrosion-protected by the cooling medium when an appropriate cooling medium is selected.

In a simply designed development of the invention, a separator element extending between the stator and the rotor is provided for separation of the stator area from the rotor area by which element the stator is encapsulated, in particular together with a casing of the generator. Since the separator element is no structural component and accordingly does not have to perform any bearing functions, it can be designed very thin. A distance between the stator and the rotor, which plays a crucial role for the effectivity of the generator, can accordingly be kept very low. Possible losses caused by the slightly increased distance between the rotor and the stator of the generator due to the separator element can if necessary be compensated for in simple manner by a minor increase in a magnetic field strength in comparison to a conventional generator without separator element.

Both the features stated in the patent Claims and the features stated in the following exemplary embodiments of the accessory gearbox in accordance with the invention are each suitable, singly or in any combination with one another, to develop the subject matter of the invention. The respective feature combinations do not represent any restriction with regard to the development of the subject matter in accordance with the invention, but have substantially only exemplary character.

Figure 2:
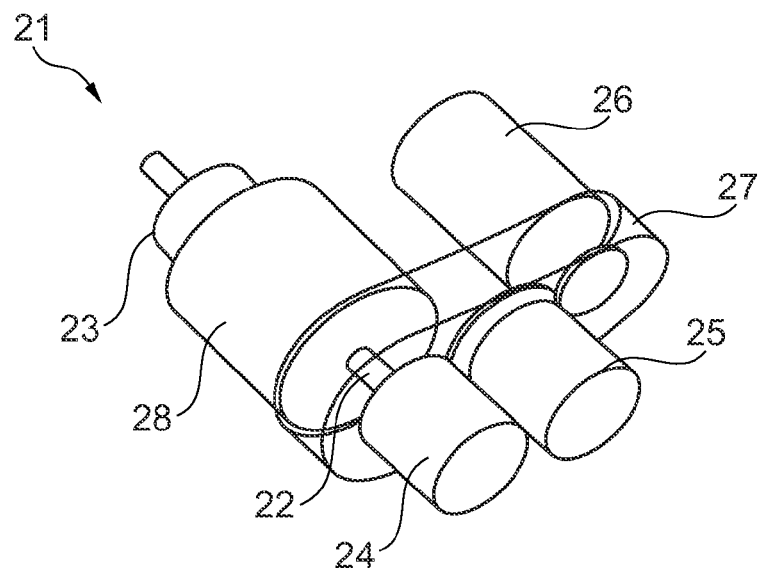
Figure 3:
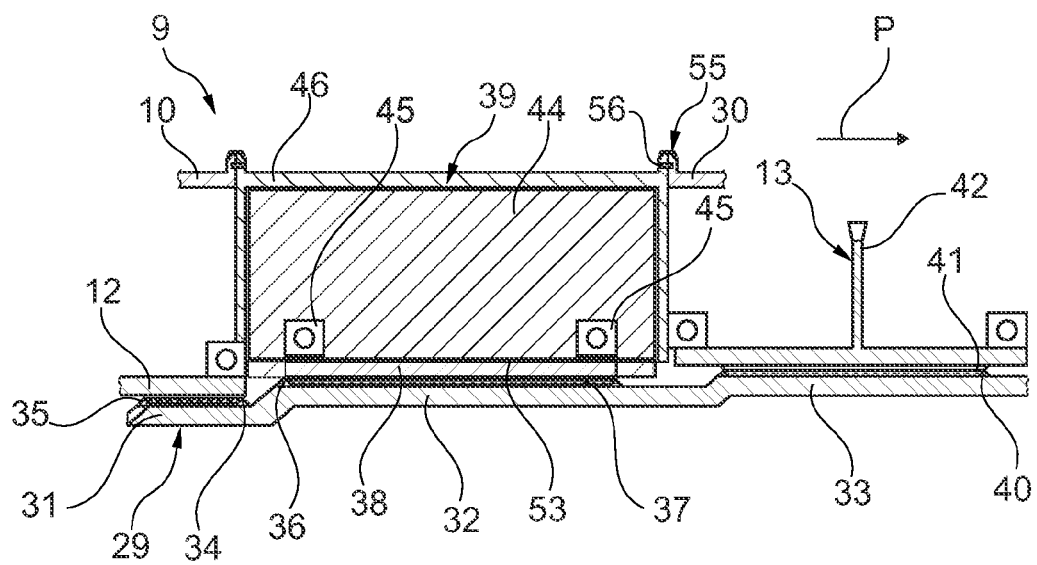
Figure 4:
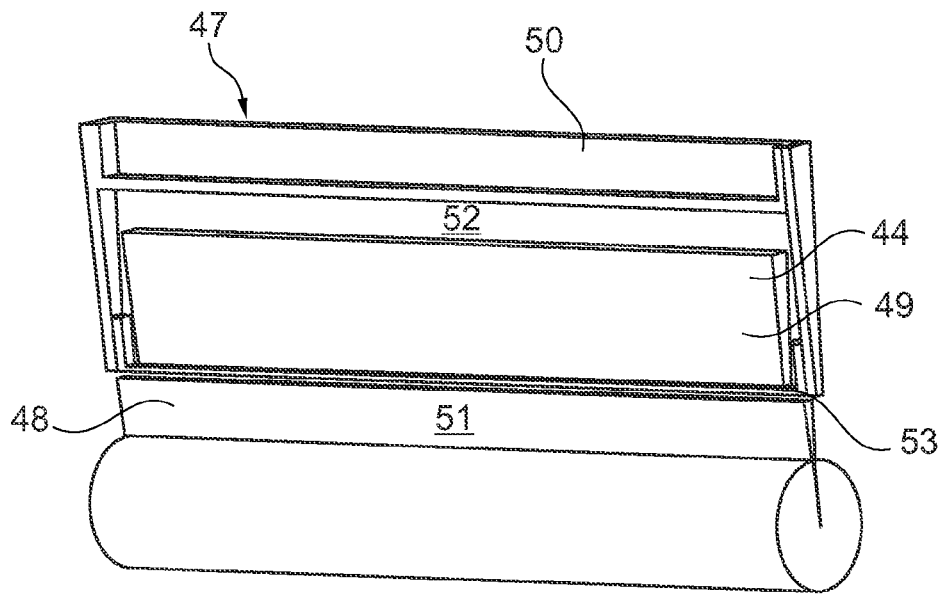

Further advantages and advantageous embodiments of the accessory gearbox in accordance with the invention become apparent from the patent Claims and the exemplary embodiments described in principle in the following with reference to the accompanying drawing. In the drawing, FIG. 1 shows a highly schematized longitudinal sectional view of a jet engine featuring an accessory gearbox arranged substantially in the radial direction in the area of an intermediate casing of the jet engine, the accessory gearbox being provided with a generator arranged on an extension shaft, FIG. 2 shows a simplified three-dimensional representation of the accessory gearbox as per FIG. 1 with a generator being arranged on the extension shaft, FIG. 3 shows a simplified sectional view of the accessory gearbox, where a linking of the extension shaft to a drive shaft and an arrangement of the generator and of a gear on the extension shaft for driving an auxiliary unit can be seen, and FIG. 4 shows a simplified representation of an area of the generator arranged on the extension shaft, where a separator element separating a stator area from a rotor area of the generator can be seen.

FIG. 1 shows a jet engine 1, which is provided with a bypass duct 2 and an intake area 3, where a fan 4 adjoins downstream the intake area 3 in a manner known per se. Again downstream of the fan 4, the fluid flow in the jet engine 1 splits into a bypass flow and a core flow, with the bypass flow flowing through the bypass duct 2 and the core flow into an engine core 5 which is in turn designed in a manner known per se with a compressor device 6, a burner 7, a low-pressure turbine 8 intended for powering the fan 4 and a high-pressure turbine 8.1 intended for powering the compressor device 6.

FIG. 1 furthermore shows a schematically represented accessory gearbox 9 which is arranged substantially in the area of an intermediate casing 10 of the jet engine 1, and which can be coupled to an auxiliary unit designed as a generator 39. The intermediate casing 10 is located, when viewed in the radial direction of the jet engine, in an area between the engine core 5 and the bypass duct 2.

To drive the accessory gearbox 9, a drive shaft 12 interacting with an engine shaft 11 is provided, which is arranged substantially parallel to the engine shaft 11 and interacts with said engine shaft 11 in this case via an auxiliary shaft 16. The auxiliary shaft 16 is linked via a bevel gearing 15 to the engine shaft 11, where it interacts with a high-pressure shaft which rotates in the operating state of the jet engine 1 at a higher speed than a low-pressure shaft arranged coaxially thereto and linked to the fan 4.

The auxiliary shaft 16 runs, proceeding from the engine shaft 11, substantially in the radial direction of the jet engine 1 through a so-called inner strut 17, i.e. a strut designed with a hollow section, outwards through the engine core 5 to the intermediate casing 10. In the area of the intermediate casing 10, the auxiliary shaft 16 interacts via a bevel gearing 18 with the drive shaft 12.

In an alternative embodiment, the accessory gearbox can also be arranged substantially in an area of a casing 19 arranged outside the bypass duct 2, where the drive shaft in particular can be driven by an auxiliary shaft passing in the radial direction through both the inner strut 17 and an outer strut 20 and which can also be designed in several parts.

The drive shaft 12 interacts via gear pairings 13, in particular spur gear stages, with an accessory gearbox 21 shown in simplified form in FIG. 2 having in this case four accessory gearbox shafts 22 and arranged substantially downstream of the intermediate casing 10. The accessory gearbox shafts 22 are arranged substantially parallel to the axis of the engine shaft 11 and positioned substantially adjacent to one another and spread in the circumferential direction of the engine 1 in the area of the intermediate casing 10, i.e. in the radial direction between the bypass duct 2 and the engine core 5.

Four auxiliary/secondary units 23 to 26 are in this case arranged on the accessory gearbox shafts 22 and the drive shaft 12, and can for example represent a fuel pump, a hydraulic pump, a bleed unit or a pneumatic starter and can be driven by the drive shaft 12 via a gearbox 27, indicated here only schematically and shown transparent, of the accessory gearbox 21. Also shown is a generator 28 arranged on the drive shaft 12 and likewise representing an auxiliary unit.

FIG. 3 shows a sectional view through the accessory gearbox 9 of FIG. 1. The drive shaft 12 is designed as a hollow shaft and can be engaged coaxially with an extension shaft 29.

The extension shaft 29 is in this case designed in three stages with three diameter areas 31, 32, 33 each having a different radial extent, where the first diameter area 31 has the lowest outer diameter of the diameter areas 31, 32, 33. The first diameter area 31 has on its outside a splined gearing 34 by means of which the extension shaft 29 can be put into a non-rotatable operative connection to a splined gearing 35 arranged on an inside of the drive shaft 12.

The first diameter area 31 of the extension shaft 29 is adjoined, on a side facing away from the auxiliary shaft 16 in the installed state of the extension shaft 29, by the second diameter area 32, which has a larger outer diameter than the first diameter area 31 of the extension shaft 29. The second diameter area 32 of the extension shaft 29 has on its outside facing the rotor 38 a splined gearing 36 designed for interaction with a splined gearing 37 corresponding thereto of a rotor 38 of the generator 39. The extension shaft 29 thus forms a continuous shaft for the generator 39 in the installed state of said generator 39.

The second diameter area 32 of the extension shaft 29 is adjoined, on the side facing away from the first diameter area 31 of the extension shaft 29, by the third diameter area 33 of the extension shaft 29, which has a larger outer diameter than the second diameter area 32 of the extension shaft 29. The third diameter area 33 of the extension shaft 29 too is provided on its outside with a splined gearing 40 designed for interaction with a gear 42 of the gear pairing 13 likewise having on its surface facing the extension shaft 29 a splined gearing 41. The third diameter area 33 of the extension shaft 29 can, in an alternative embodiment of the invention, be designed for interaction with a further auxiliary/secondary unit.

For axial securing of the extension shaft 29 in the state shown of interaction with the drive shaft 12, a securing device designed as a securing ring and not shown in further detail is provided, by means of which the extension shaft 29 can be fixed in the axial direction relative to a casing 30 of the accessory gearbox 9.

The generator 39 has, besides the rotor 38, a stator 44 which in this case is mounted relative to the rotor 38 by two bearings 45.

A casing 46 of the generator 39 can be linked in an axial direction on the one hand to the intermediate casing 10 and on the other hand to the casing 30 of the accessory gearbox 9, where fastening devices designed as V-band clips 55 are provided for that purpose. The V-band clips 55 each interact here with a flange of the casing 46 of the generator 39 and with a flange of the intermediate casing 10 or a flange of the casing 30 of the accessory gearbox 9, respectively. To prevent rotation of the casing 46 of the generator 39 relative to the casing 30 of the accessory gearbox or the intermediate casing 10, a pin 56 is provided in each case. The pin 56 is inserted substantially in the axial direction of the extension shaft 29 from one side of the generator into the respective flanges, so that it can be detached in simple manner for removal of the generator 39.

A cooling device not shown in detail of the generator 39 is in this case connected to an engine system such that the generator 39 does not have to have a separate coolant tank nor a separate coolant pump.

Furthermore, an oil system not shown in detail in FIG. 3 is provided, which is intended for lubricating components of the generator 39. The oil system can be connected as a separate oil system of the generator 39, or in a comparable manner to the cooling device, to an oil system of the engine 1.

By the design as described of the extension shaft 29, it can, after detachment of the securing ring, be moved in the direction of the arrow P out of engagement with the drive shaft 12 in a translational movement relative to the drive shaft 12. Since the generator 39 is mounted stationarily in the axial direction relative to the intermediate casing 10, the generator 39 is here held by the intermediate casing 10 in its position and moved in the direction of the first diameter area 31 of the extension shaft 29. Once the extension shaft 29 has moved over a certain distance in the direction of the arrow P and the generator 39 has been disengaged from the extension shaft 29, the generator 39 can be removed in simple manner in the radial direction out of the area of the intermediate casing 10, for example to be replaced or maintained. The generator 39 can be arranged again in reversed sequence on the extension shaft 29 and the latter can be put into operative connection with the drive shaft 12.

In order to supply sufficient lubricant to the connection areas of the extension shaft 29 with the drive shaft 12, the rotor 38 and the gear 42 in the installed state of the extension shaft 29, the diameter areas 31, 32, 33 are provided with recesses, not shown in detail, through which a lubricant is supplied during rotation of the extension shaft 29 in an operating state of the jet engine 1 by a centrifugal force to the splined gearings 34, 35, 36, 37, 40, 41. A lubricant supply is arranged on the side of the intermediate casing 10 in order to allow the installation of an air turbine starter on an opposite accessory gearbox side. Cooling of the extension shaft 29 is assured by an oil nozzle arranged in the area of a gearbox casing of the accessory gearbox 9.

FIG. 4 shows an alternatively designed generator 47, provided with a rotor 48, a stator 49 and a casing 50, where the rotor 48 can, like the rotor 38 of the generator 28, be fixed non-rotatably on the extension shaft 29 by a splined gearing not shown in detail. Unlike the generator 28, the stator 49 of the generator 47 is mounted on the casing 50.

A separator element 53 representing a casing device is arranged between a rotor area 51 receiving the rotor 48 and a stator area 52 receiving the stator 49, by which element the stator 49 together with the casing 50 of the generator 47 is encapsulated from the rotor 48. The separator element 53 is made from a non-magnetic material, so that the functioning of the generator 47 is not impaired by the material of the separator element 53.

In the embodiment shown the separator element 53 is connected by fastening elements, not shown in more detail and for example designed as bolts, pins or the like, to the casing 50 of the generator 47. Since the separator element 53 does not represent a structural component, a thickness of the separator element 53 in the radial direction can be designed very small, depending on the selected material of the separator element 53. A gap between the rotor 48 and the stator 49 is therefore very narrow so that only minor losses are caused by the separator element 53.

The generator 47 has a cooling device not shown in greater detail which supplies a cooling medium, in particular oil to the rotor area 51 representing a wet area, in this case. The cooling medium removes thermal energy generated in the area of the stator 49 from the latter when the jet engine 1 is in the operating state. Since the coolant comes very close to the stator area 52 representing a dry area, the energy input by the coolant is very effective. In addition, corrosion of the rotor 48 is advantageously slowed down or prevented by the coolant.

List of Reference Numerals
1 Jet engine
2 Bypass duct
3 Intake area
4 Fan
5 Engine core
6 Compressor device
7 Burner
8 Low-pressure turbine
8.1 High-pressure turbine
9 Accessory gearbox
10 Intermediate casing
11 Engine shaft
12 Drive shaft
13 Gear pairing
14 Auxiliary units
15 Bevel gearing
16 Auxiliary shaft
17 Inner strut
18 Bevel gearing
19 Casing
20 Outer strut
21 Accessory gearbox
22 Accessory gearbox shaft
23 to 26 Auxiliary units
27 Gearbox
28 Generator
29 Extension shaft
30 Casing of accessory gearbox
31 First diameter area of extension shaft
32 Second diameter area of extension shaft
33 Third diameter area of extension shaft
34 Splined gearing of first diameter area
35 Splined gearing of first shaft
36 Splined gearing of second diameter area
37 Splined gearing of rotor
38 Rotor
39 Generator
40 Splined gearing of third diameter area
41 Splined gearing of gear
42 Gear
44 Stator
45 Bearing of generator
46 Casing of generator
47 Generator
48 Rotor
49 Stator
50 Casing of generator
51 Rotor area
52 Stator area
53 Separator element
55 V-band clip
56 Pin
P Arrow

What is claimed is:

1. An accessory gearbox for an engine including:
a drive shaft operatively connectable to a main shaft of the engine,
an extension shaft movable between a detachable operative connection to the drive shaft substantially coaxially to said drive shaft and a detached position operatively disconnected from the drive shaft, wherein, in the detached position, at least one auxiliary unit can be detachably arranged for operative connection on the extension shaft;
wherein the extension shaft is operatively disconnected from the drive shaft by a translational movement relative to the drive shaft and the at least one auxiliary unit is detached from the extension shaft by a translational movement relative to the extension shaft.

2. The accessory gearbox in accordance with claim 1, wherein an operative connection between the at least one auxiliary unit and the extension shaft is terminated by a movement of the extension shaft relative to the drive shaft in one direction.

3. The accessory gearbox in accordance with claim 1, wherein the extension shaft includes a first area for interaction with the drive shaft, a second area for interaction with the at least one auxiliary unit and a third area for interaction with at least one further accessory gearbox shaft via a gear of a gear stage.

4. The accessory gearbox in accordance with claim 3, wherein each of the first, second and third areas has a different diameter in a staged arrangement.

5. The accessory gearbox in accordance with claim 4, wherein a diameter of the first area is smaller than a diameter of the second and the diameter of the second area is smaller than a diameter of the third area.

6. The accessory gearbox in accordance with claim 3, wherein the first, second and third areas each include a splined gearing for engagement with, respectively, the drive shaft, the at least one auxiliary unit and the gear of the gear stage.

7. The accessory gearbox in accordance with claim 3, wherein the extension shaft includes at least one recess for supplying lubricant to a connection area of the extension shaft to at least one chosen from the drive shaft, the at least one auxiliary unit and the gear of the gear stage.

8. The accessory gearbox in accordance with claim 1, wherein the at least one auxiliary unit is a generator and is operatively connected upstream of further auxiliary units in a force flow of the accessory gearbox.

9. The accessory gearbox in accordance with claim 1, and further comprising a casing of the auxiliary unit configured for linking to an adjoining casing in an installed state of the auxiliary unit in an axial direction of the extension shaft, wherein the adjoining casing is at least one chosen from a casing of the accessory gearbox and an intermediate casing.

10. The accessory gearbox in accordance with claim 9, and further comprising a fastening device for linking the casing of the auxiliary unit to the adjoining casing in the axial direction of the extension shaft, the fastening device including at least one chosen from a V-band clip and a bolt connection.

11. The accessory gearbox in accordance with claim 1, and further comprising a securing device for fixing the extension shaft against a movement relative to the drive shaft in an axial direction.

12. The accessory gearbox in accordance with claim 1, wherein the extension shaft is arranged overall in an area of the intermediate casing of the engine.

13. The accessory gearbox in accordance with claim 1, wherein the at least one auxiliary unit is configured for supplying power to an engine control system.

14. The accessory gearbox in accordance with claim 1, wherein the least one auxiliary unit includes a separate cooling system.

\* \* \* \* \*